March 8, 1955  I. KALIKOW  2,703,847
DRIVING MECHANISM FOR STARTER-GENERATOR
Filed Nov. 24, 1953
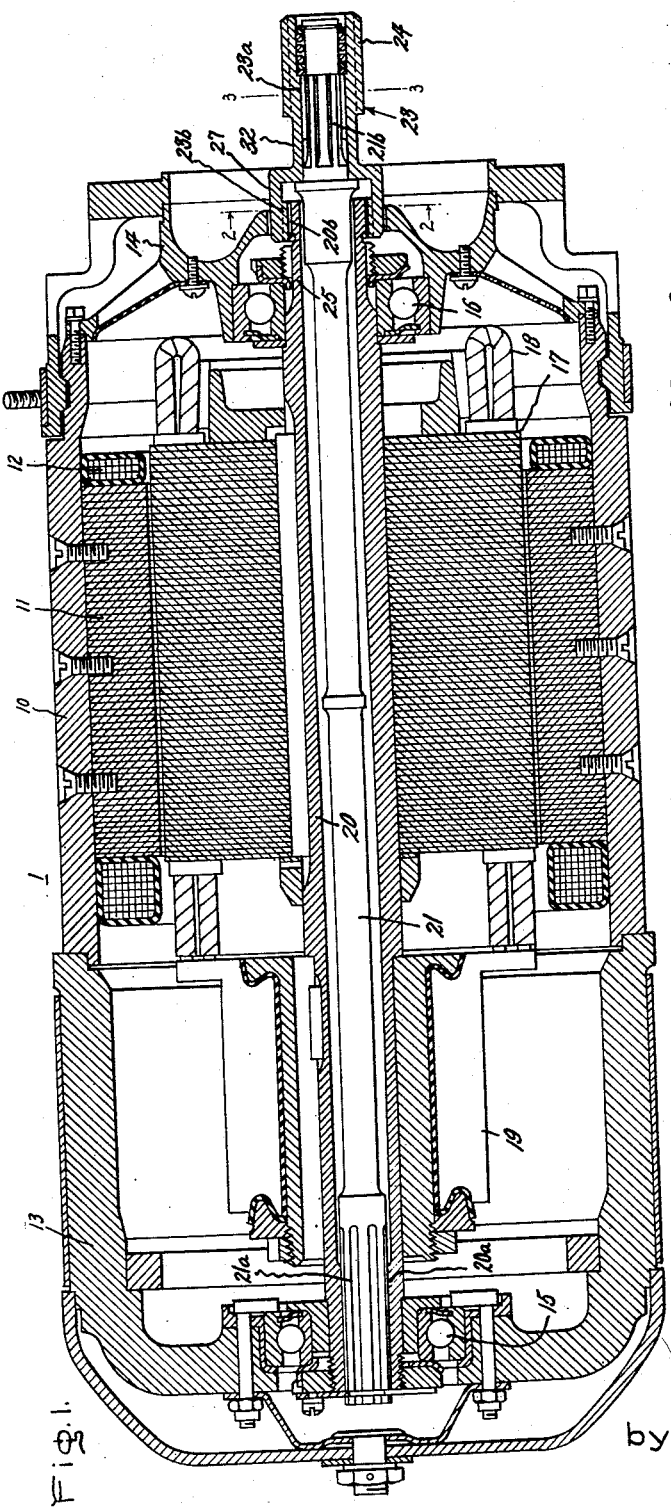
Inventor:
Irving Kalikow,
by Claude H. Mott
His Attorney

United States Patent Office 2,703,847
Patented Mar. 8, 1955

2,703,847

DRIVING MECHANISM FOR STARTER-GENERATOR

Irving Kalikow, Swampscott, Mass., assignor to General Electric Company, a corporation of New York Application November 24, 1953, Serial No. 394,016

5 Claims. (Cl. 290—46)

This invention relates to a driving mechanism and in partaicualra to such a mechanism which provides a resilient cushioning drive under some conditions and a rigid drive under other conditions.

In the past, the employment of torsional shafts between a power source, such as an aircraft engine, and a generator has been utilized to provide for the necessary cushioning of the power transmitted from the engine. Such an arrangement is required because aircraft engines are subject to sudden and irregular changes in speed which would impose destructive stresses on a generator rigidly coupled thereto. In such applications, and especially where the prime mover is of the reciprocating type, the resilient drive mechanism between the generator rotor and the prime mover are subject to repetitive torsional vibrations built up by the intermittent firing of the various cylinders of the engine. Consequently, the drive mechanism must incorporate means to limit the amplitude of these oscillations at the critical frequency of the torsional shaft-generator combination. Such an arrangement is described and claimed in applicant's U. S. Patent 2,658,361, dated November 10, 1953, and assigned to the assignee of the present application.

Additionally, in order to eliminate the need for a separate starter and a separate generator, it is further desirable to provide a single dynamoelectric machine which will perform the functions of both these machines. In order to do this, a rigid connection must be provided between the dynamoelectric machine and the prime mover to transmit the high torque to the machine when it is operating as a starter, since the torque at this time is approximately four times the torque transmitted by the driving mechanism when the dynamoelectric machine is being operated as a generator. Such a force is sufficient to shear the resilient drive shaft of the driving mechanism if the resiliency of the mechanism is such that it will satisfactorily cushion the shocks when the machine is operating as a generator.

Accordingly, it is the object of the present invention to provide a starter generator having a driving mechanism which will provide a rigid connection at certain times and a resilient connection at other times.

It is a further object of this invention to provide a driving mechanism which will simply and satisfactorily serve to transmit a low torque through a resilient drive arrangement and will also transmit a high torque through a rigid drive arrangement.

Another object of this invention is to provide a parallel drive arrangement for the transmission of power between a prime mover and a dynamoelectric machine for transmitting two levels of torque under varying conditions.

A still further object of this invention is to provide a parallel drive arrangement for a starter-generator which will transmit low torque through a resilient vibration limiting connection when the starter-generator is operating as a generator and will transmit high torque through a rigid connection when the starter-generator is operating as a starter.

Further objects and advantages of this invention will become apparent and this invention will be better understood from the following description referring to the accompanying drawing, and the features of novelty which characterize this invention will be pointed out with particularity in the claims annexed to and forming part of this specification.

In the drawing, Figure 1 is a sectional view of a starter-generator illustrating the drive arrangement of my invention.

Figure 2 is a sectional view along the line 2—2 of Figure 1 illustrating the connection between the outer drive shaft and the adapter of my invention.

Figure 3 is an enlarged sectional view along the line 3—3 of Figure 1.

In the illustrated embodiment of this invention, the rotor of the starter-generator is secured to a hollow quill shaft. One end of the hollow quill shaft is closely coupled as by splines to an inner quill shaft. Both the outer and the inner shafts are provided with splines at their free ends. An engine engaging adapter having two sets of splines to loosely engage the splines of the inner and outer shafts, respectively, is provided. The splines on the outer shaft and the mating splines on the adapter are provided with a larger torsional clearance than the mating splines between the inner shaft and the adapter so that they do not contact each other when the starter-generator is operating as a generator. Under this operating condition, the loosely mating splines between the inner shaft and the adapter serve to transmit the torque from the engine to the starter-generator and to limit the oscillatory vibrations of the rotor. Under starting conditions, however, when the starter-generator is driving the engine and a greatly increased torque is transmitted by the driving arrangement, the resilient inner shaft twists to permit the engagement between the mating splines of the adapter and the outer shaft.

This arrangement prevents destructive forces from being imparted to shear the inner shaft during the starting phase and yet retains the resiliency and the oscillation limiting characteristics of the resilient inner shaft required during the generating phase.

In the drawing, a starter-generator generally referred to by the numeral 1 is shown and is provided with a stationary member 10 having a mechanical field structure 11 adapted to be excited by field exciting winding 12. Starter-generator 1 is provided with end shields 13 and 14 having bearing housings in which anti-friction bearings 15 and 16, respectively, are arranged for supporting a rotatable member. As shown, the rotatable member 17 comprises an armature having a core of magnetic material with an armature winding 18 arranged in the winding slots therein and connected to a commutator 19. Rotatable member 17 is mounted on quill shaft 20 and adapted to be driven by any suitable prime mover through a torque rod 21. Torque rod 21 and quill shaft 20 are shown as being provided at one end with closely fitting mating splines 21a and 20a, respectively, for the transmission of torque therebetween. The free end of torque rod 21 is formed with a splined section 21b thereon, which is adapted to provide a loose fit with the splines 23a of complementary splined adapter 23 for connecting the torque rod 21 to the prime mover. Adapter 23 is provided with external splines 24 for engaging corresponding splines of the prime mover.

Referring particularly to Figure 3, it will be observed that clearance between the splines 21b on torque rod 21 and the mating splines 23a on the adapter 23 permit limited relative torsional movement therebetween to momentarily disconnect the prime mover from the torque rod 21 to limit the amplitude of the torsional vibrations of armature 17 of the starter-generator 1. It is preferable that this torsional clearance be approximately three times the maximum amplitude of the torsional vibrations of the prime mover. The design and operation of this torsional clearance is more fully described in U. S. Patent 2,658,361.

It is apparent from the foregoing that since the requirement for this driving arrangement, as disclosed and claimed in aforesaid Patent 2,658,361, must momentarily disconnect the prime mover from the starter-generator to be operative, a torsional clearance could be provided between splines 20a and 21a and the adapter 23 and the torque rod 21 could be closely splined. Moreover, it is equally apparent that other mechanical coupling means could be utilized between quill shaft 20 and torque rod 21, and torque rod 21 and adapter 23 so long as one of these connecting means provides a torsional clearance for the reasons hereinbefore disclosed.

The free end 25 of quill shaft 20 extends beyond the end of bearings 16 and is provided on its outer periphery with a set of splines 20b. Adapter 23 is provided with an end 27 which presents complementary splines 23b toward quill shaft 20 to cooperate with splines 20b thereon. As can best be seen in Figure 2, there are very large torsional clearances between the splines 20b of quill shaft 20 and the splines 23b of adapter 23. The torsional clearance between splines 20b and 23b must be larger than the torsional clearance between splines 21b and 23a so that splines 20b and 23b will not provide a mechanical coupling between the rotor 17 and the adapter 23 in parallel with torque rod 21 during the generating phase of operation. The clearance, however, must be such that it will not permit sufficient strain on the torque rod 21 to cause any permanent deformation thereof during the starting phase of operation. It will be obvious to those skilled in the art that the maximum clearance permissible will be determined by the resiliency and dimensions of the torque rod 21. In one application, a torsional clearance of 8° between torque rod 21 and adapter 23 combined with a torsional clearance of 21° between adapter 23 and quill shaft 20 produced satisfactory results. Thus the torsional clearance between the quill shaft 20 and the adapter 23 should be about 2½ times the torsional clearance between torque rod 21 and adapter 23.

The operation of the driving mechanism is as follows:

With the starter-generator machine operating as a generator driven by the prime mover, torque is transmitted from the prime mover to the splines 24 of adapter 23 through splines 23a and 21b to the torque rod 21 and thereafter through the splines 20a and 21a to quill shaft 20 to the armature 17 of the machine. The torsional deflection of the torque rod 21 due to the generator load is in the direction so as to decrease clearance 30, so that clearances 30 and 31 are approximately equal under average generator loads.

Because of the resiliency of the torque rod 21, rapidly changing torques are cushioned to prevent their destructive effects on the machine. Additionally, since the armature 17 plus the torque rod 21 correspond to a spring-mass oscillator having a critical frequency, torsional vibrations of this critical frequency transmitted from the prime mover are prevented from setting up violent, destructive oscillations in the spring-mass oscillator by the momentary interruption of the transmission of power from the prime mover to the armature 17, thereby interrupting the time-phase relationship between the input energy tending to increase the oscillations and the oscillations of the armature 17. This momentary interruption in the transmission of power results from the disconnection between the splines 21b on the torque rod and their mating splines 23a of the adapter 23. During the operation of the starter-generator 1 as a generator, there is no contact between the mating splines 23b of the adapter and 20b of the quill shaft, and consequently no wear is caused thereon.

When the starter-generator 1 is operating as a starter, force is transmitted to the prime mover. The severity of this force is sufficient to twist torque rod 21 in two if torque rod 21 is properly designed to provide the required resiliency to perform its function of protecting the starter-generator from shocks during generator operation. To prevent this, the torque exerted by the armature of the machine causes the twisting of the torque rod 21 to close the clearance 31 and cause a direct mechanical connection between the splines 20b and the quill shaft 20 and the splines 23b on the adapter 23. Since this driving connection is in parallel with the torque rod 21, it serves to assist torque rod 21 in delivering the torque to the adapter 23 and prevents permanent injury to torque rod 21. This driving connection, therefore, is operative only when the starter-generator 1 is transmitting power to the prime mover. By making clearance 31 small when no torque is being transmitted between the starter-generator 1 and the prime mover, the impact shock is reduced upon the initiation of the starting phase.

Adapter 23 is shown as being provided with a reduced section 32 which serves as a shear portion to limit the maximum torque which may be transmitted to prevent serious injury to the prime mover or to the starter-generator in the event the torque transmitted therebetween exceeds a preselected value.

It will readily be seen that this invention provides for a driving mechanism which permits the transmission of a high torque between a starter-generator and a prime mover and also retains the resilient connection between these members for normal operation.

While there is shown and described particular embodiments of this invention, further modifications and improvements will occur to those skilled in the art. It is to be understood, therefore, that this invention is not limited to the particular form shown, and it is intended in the appended claims to cover all modifications which do not depart from the spirit and scope of this invention.

What I claim as new and desire to secure by Letters Patent of the United States is:

1. A starter-generator having a stator and a rotor mounted on a shaft, said shaft providing for the coupling of said starter-generator and a power source and comprising a quill shaft mounted for rotation in said stator and having splines on each end thereof, a resilient torque rod within said quill shaft having splines at each end thereof, the splines at one end of said torque rod cooperating with the splines at one end of said quill shaft to provide a mechanical connection therebetween, and an adapter providing splines for engaging the respective splines on the free ends of said torque rod and said quill shaft, the splines on one end of said torque rod being dimensioned to provide a torsional clearance with the splines cooperating therewith, and the splines on the free end of said quill shaft providing a torsional clearance with the cooperating splines on said adapter, said second-mentioned torsional clearance being greater than said first-mentioned torsional clearance.

2. A starter-generator as recited in claim 1, wherein the clearance between the mating splines of said adapter and said quill shaft is less in one direction than in the other.

3. A drive mechanism for a starter-generator adapted to be connected to a power source subject to torsional vibrations comprising a quill shaft, a torque rod within said quill shaft, said torque rod and said quill shaft, being fixedly connected at one end thereof, the other ends of said torque rod and said quill shaft providing splines, an adapter for engaging said prime mover providing two sets of splines for engaging the splines on said torque rod and said quill shaft with a torsional clearance respectively with the torsional clearance between mating splines of said adapter and said quill shaft being greater than the torsional clearance between the mating splines of said adapter and said torque rod.

4. The drive mechanism as recited in claim 3, wherein said adapter is provided with a shear section of reduced area to limit the maximum torque which may be transmitted between said starter-generator and said prime mover.

5. A starter-generator having a stator and a rotor mounted on a shaft, said shaft providing for the coupling of said starter-generator and a power source and comprising a quill shaft mounted for rotation in said stator and having coupling means on each end thereof, a resilient torque rod within said quill shaft having coupling means at each end thereof, the coupling means at one end of said torque rod cooperating with the coupling means at one end of said quill shaft to provide a mechanical connection therebetween, and an adapter providing coupling means for engaging the respective coupling means on the free ends of said torque rod and said quill shaft, the coupling means on one end of said torque rod providing a torsional clearance with the coupling means cooperating therewith, and the coupling means on the free end of said quill shaft providing a torsional clearance with the cooperating coupling means on said adapter.

(References on following page)

References Cited in the file of this patent

UNITED STATES PATENTS

| | | |
|---|---|---|
| 1,236,803 | Williams | Aug. 14, 1917 |
| 1,921,719 | Allen | Aug. 8, 1933 |
| 2,144,445 | Wilber | Jan. 17, 1939 |
| 2,500,281 | Fell | Mar. 14, 1950 |
| 2,590,169 | Fritz | Mar. 25, 1952 |
| 2,658,361 | Kalikow | Nov. 10, 1953 |

FOREIGN PATENTS

| | | |
|---|---|---|
| 940,473 | France | May 24, 1948 |
| 1,000,903 | France | Oct. 17, 1951 |
| 455,838 | Great Britain | Oct. 28, 1936 |
| 597,063 | Great Britain | Jan. 16, 1948 |